United States Patent [19]
Woo

[11] Patent Number: 5,200,675
[45] Date of Patent: Apr. 6, 1993

[54] COMMUTATION CIRCUIT FOR A BRUSHLESS D.C. MOTOR

[75] Inventor: Kwangjoon Woo, Seoul, Rep. of Korea

[73] Assignee: Zen Zen Electric Company Ltd., Seoul, Rep. of Korea

[21] Appl. No.: 788,332

[22] Filed: Nov. 5, 1991

[30] Foreign Application Priority Data

Nov. 6, 1990 [KR] Rep. of Korea ............... 90-17914

[51] Int. Cl.$^5$ ............................................. H02P 5/00
[52] U.S. Cl. ................................. 318/254; 318/439; 318/138
[58] Field of Search ......... 318/254, 138, 439, 799-812

[56] References Cited

U.S. PATENT DOCUMENTS

| | | | |
|---|---|---|---|
| 4,107,595 | 8/1978 | Campe | 318/138 X |
| 4,415,844 | 11/1983 | Mendenhall et al. | 318/254 |
| 4,656,403 | 4/1987 | Treffer | 318/439 X |
| 4,686,437 | 8/1987 | Langley et al. | 318/254 |
| 4,743,815 | 5/1988 | Gee et al. | 318/254 |
| 4,761,598 | 8/1988 | Lovrenich | 318/254 X |
| 4,868,467 | 9/1989 | Davis | 318/254 |
| 5,034,668 | 7/1991 | Bausch | 318/254 |

*Primary Examiner*—A. Jonathan Wysocki
*Attorney, Agent, or Firm*—Handal & Morofsky

[57] ABSTRACT

A commutation circuit for a brushless D.C. motor which circuit maximizes motor torque and motor efficiency for all ranges of motor load and speed, regardless of the connecting and conducting method of the phase coil, by optimizing the commutation pulses from the commutation encoder of the motor. Optimization is accomplished by advancing the commutation pulses to an angle corresponding to the inverse tangent function of the motor velocity and the load current, and by optimizing the commutation pulse width.

9 Claims, 11 Drawing Sheets

FIG.5 photo transistor

COMMUTATION CIRCUIT FOR A BRUSHLESS D.C. MOTOR

TECHNICAL BACKGROUND

The invention refers to an optimal commutation circuit for a trapezoidal driving brushless D.C. motor, particularly in which the commutation pulse of a commutation encoder for a brushless D.C. motor may be optimized by advancing the commutation pulses and at the same time by optimizing the commutation pulse width.

BACKGROUND OF THE INVENTION

In brushless D.C. motors, phase commutation of the stator coil is carried out by detecting the rotor pole position with a sensing device (for example, photo transistors, hole devices, etc.) and generating a commutation pulse with a predetermined constant velocity ($\omega_1$).

In the case where the sensing device is fixed in place, there is a problem in that the optimal torque and efficiency of the motor can be maintained only at one velocity ($\omega_1$), and the mass production and repair of the motor is difficult because the sensing device is fixed at the specified position. Also, since only a motor meeting certain specific requirements can be used, there is no flexibility.

SUMMARY OF THE INVENTION

The above problems are solved by this invention. An improved commutation method for achieving the object of this invention is to vary the phase current switching position according to the velocity of the motor and the magnitude of the load, that is, varying the commutation advance angle ($\alpha$) according to the reaction of the armature.

The torque generated from one phase coil is proportional to the current flowing in the coil, with the current lagging the voltage supplied to the phase coil up to a degree of $\alpha° = \tan^{-1}(\omega, i)$, without relation to the connecting method (Y-connection, $\Delta$-connection or phase independent connection) or the conducting method; that is, unipolar (half-wave driving) or bipolar (full-wave driving).

Thus, the sensing position of the sensing device which detects the rotor pole will be disposed in advance of the corresponding phase coil position to a degree of $\alpha° = \tan^{-1}(\omega, i)$.

The sensing, and thus switching position should be varied according to the motor velocity ($\omega$) and the load current (i) flowing in the stator coil, in order to obtain maximum motor torque and efficiency.

The commutation pulse width should also be modulated to a width in which the maximum efficiency of the motor can be exhibited, and if the width is much smaller than the commutation width according to the position of the corresponding phase coil, the maximum torque may not be exhibited and also, if the width is greater, the efficiency may be deteriorated on account of the reverse torque which is generated at that time.

Accordingly, to achieve maximum torque and efficiency, the switching position should be moved ahead of the commutation pulse generated at the time when the position of the phase coil and the rotor position sensing device coincide, to a degree of $\alpha° = \tan^{-1}(\omega, i)$, which is dependent on the motor velocity ($\omega$) and the load current (i).

In addition, the commutation pulse width is varied so that maximum efficiency can be exhibited. Preferred embodiments carrying out this invention will be described in more detail later.

Accordingly, the object of this invention is to provide an optimal commutation circuit for a trapezoidal driving brushless D.C. motor, in which the position detecting sensors for the phase coil and the rotor are advanced to a more advanced position than the commutation pulse by as much as the commutation advance angle $\alpha$ ($\alpha° = \tan^{-1}(\omega, i)$), which is displayed as the function of $\tan^{-1}$ depending on the motor velocity ($\omega$) and the load current (i). The commutation pulse width is also varied.

Another object of this invention is to achieve maximum motor torque and motor efficiency within all of the ranges of motor speed and load, as well as to be applicable regardless of the connecting and conducting method of the phase coil, by providing an optimal commutation circuit which provides optimal commutation and optimal commutation pulse width for maximum torque and efficiency.

Another object of this invention is to make mass production of the above mentioned brushless D.C. motors possible, and make it convenient to repair the motors, by mounting the sensing device for detecting the position of the rotor in an identical position in all of the motors, so that the sensing device for detecting the position can be mounted conveniently.

The invention is characterized in that the optimal commutation circuit for the trapezoidal driving brushless D.C. motor comprises an $\alpha$ROM which is reserving, as data, a commutation advance angle ($\alpha$) of the commutation pulse, represented by the inverse tangent function of the motor velocity and the load current;

an $\alpha$ROM addressing portion which is supplying an address signal into address terminals ($A_0$–$A_{11}$) of the $\alpha$ROM;

A pattern ROM addressing portion comprising presettable upcounters which count up using the output of binary counters as clock signals, the binary counters having been present at every reference commutation pulse by the commutation advance angle ($\alpha$), corresponding to the present motor velocity and load current read in $\Delta$ROM according to the output signal of the $\alpha$ROM addressing portion and a data selector which selects one of two signals, that is, either the commutation pulses ($N_A$–$N_C$, $S_A$–$S_C$) for outputting a starting commutation pattern from the pattern ROM, or the output signal of the presettable up-counter, for outputting a driving commutation pattern from the pattern ROM;

A starting/driving signal selecting portion which outputs signals into the data selector of the pattern ROM addressing portion, for the purpose of selecting a starting/driving state;

A pattern ROM which outputs a starting commutation pattern according to the commutation pulses ($N_A$–$N_C$, $S_A$–$S_C$), or a driving commutation pattern according to the output signal of the presettable up-counters of the pattern ROM addressing portion; and a clockwise/counterclockwise motor rotation selecting portion which outputs signals, selected according to either clockwise or counterclockwise motor rotation, into the pattern ROM.

The prior art exhibits maximum motor torque and motor efficiency only at any one revolving velocity ($\omega_1$) and one constant load current (i), by adjusting the sensing device, for detecting the portion of the rotor, by hand to a desired position, where the commutation pulse is moved forward by as much as $\tan^{-1}(\omega_1, i_1)$ with relation to any one velocity ($\omega_1$) and one constant load current ($i_1$), that is, moved backward as much as the desired angle in the direction of rotation. When compared to the prior art, this invention, as an optimal commutation circuit, has maximum efficiency and maximum torque in all ranges of motor velocity and load variance, and is applicable regardless of the method of phase coil connection and conduction.

This invention also makes it easy to set the sensing device for detecting the position of the rotor, makes mass production of the motors possible, makes repair of the motors easier, and makes driving the motor in either a clockwise or counterclockwise rotational direction possible.

The novel features which are considered as characteristics for the invention are set forth in particular in the appended claims. The invention itself, however, both as to its construction and its method of operation, together with additional objects and advantages thereof, will be best understood from the following description of specific embodiments, when read in connection with the accompanying drawings.

BRIEF DESCRIPTION OF THE DRAWINGS

FIGS. 9(a)-9(d) depict commutation patterns displayed with the electrical angles, their addresses being stored in a pattern ROM;

DETAILED DESCRIPTION OF THE PREFERRED EMBODIMENTS

Figure 1:
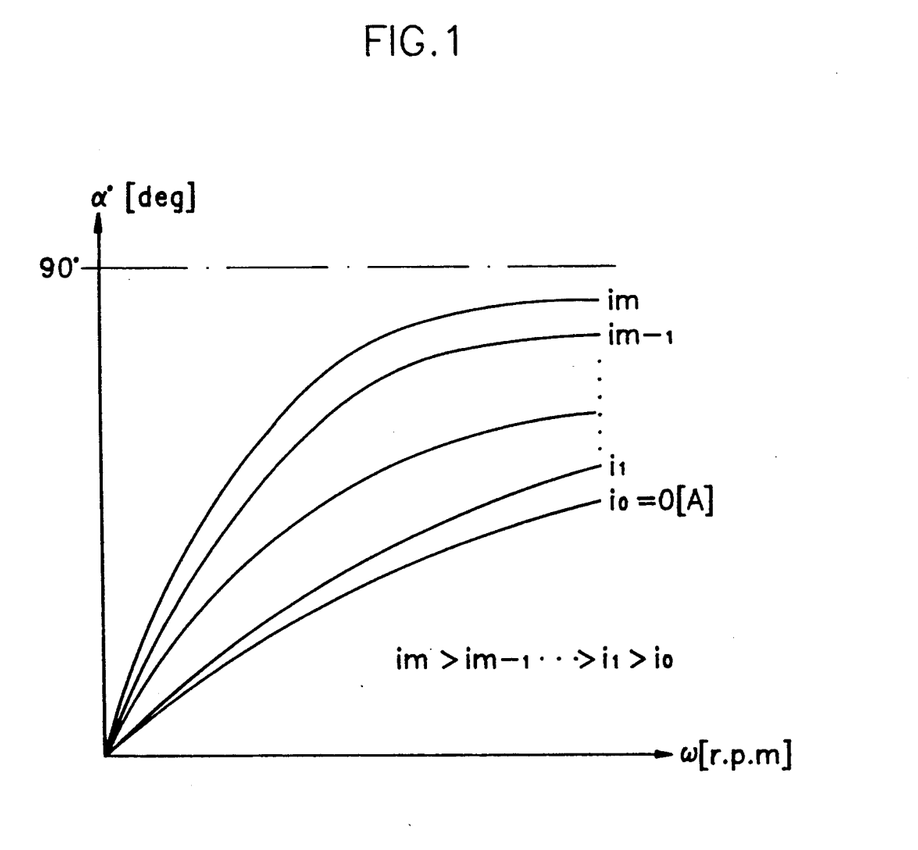
FIG. 1 depicts several curves representing functions in which the commutation advance angle ($\alpha$) of the optimal commutation circuit of this invention is indicated by the function of the motor velocity ($\omega$) and load current (i)

FIG. 1 depicts several curves representing functions in which an advanced angle $\alpha^*$ is demonstrated by the function of the motor velocity ($\omega$) and the load current (i), with the relation of the function in the form of $\alpha^* = -\tan^{-1}(\omega, i)$. The change in motor velocity ($\omega$) is shown as continuous, while the change in load current (i) is shown as discrete.

Figure 2:
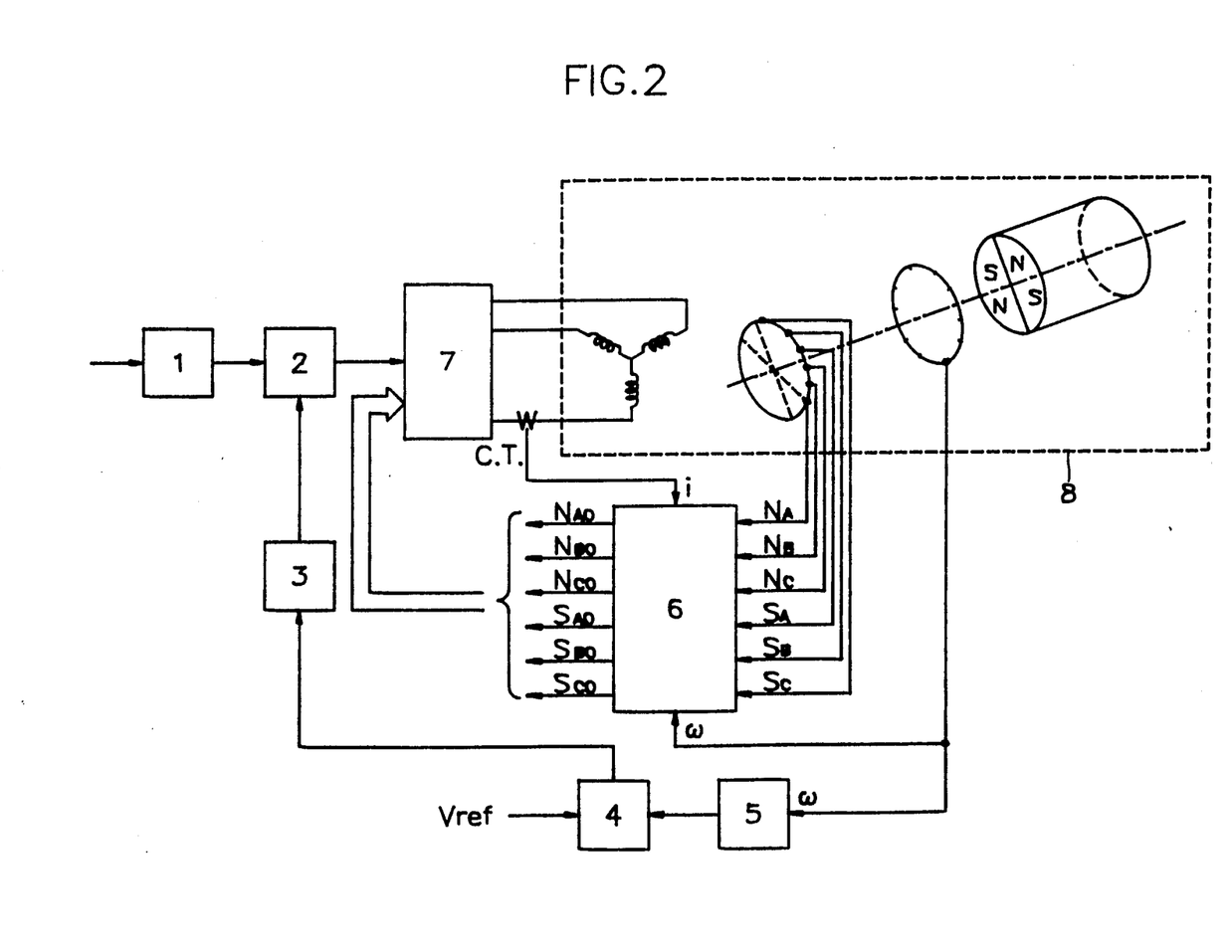
FIG. 2 is a block diagram of the operation of a control system of a brushless D.C. motor including the optimal commutation circuit of this invention (with respect to a 4-pole 3-phase Y-connection bipolar brushless D.C. motor)

FIG. 2 depicts a block diagram of the operation of a control system of a 4-pole 3-phase Y-connection bipolar brushless D.C. motor including the optimal commutation circuit of this invention.

In the block diagram are shown a power supply circuit 1, switching circuits 2 and 3, velocity controlling circuit 4, frequency-voltage converter 5, optimal commutation circuit 6 of this invention, switching power amplifier 7 connected to the stator-phase coil, and motor portion 8 which is composed of a rotor, a commutation encoder, including rotor position sensing devices, a revolving shutter, and a velocity encoder, which includes a velocity sensing device and a slit disc.

The operation of the control system is as follows: commutation pulses ($N_A$, $N_B$, $N_C$, $S_A$, $S_B$, $S_C$), which are generated from the commutation encoder including the rotor position sensing devices and the revolving shutter of motor portion 8, are inputted to the optimal commutation circuit 6, and the optimal commutation pulses ($N_{AO}$, $N_{BO}$, $N_{CO}$, $S_{AO}$, $S_{BO}$, $S_{CO}$) are outputted into the switching power amplifier 7 as explained below.

Switching circuit 2 amplifies the voltage supplied from the power supply circuit 1 according to the output signal of the switching circuit 3, and then supplies the amplified voltage to the switching power amplifier 7.

At this time, if the commutation signals ($N_A$, $N_B$, $N_C$, $S_A$, $S_B$, $S_C$) generated from the rotor position sensing devices ($S_1$-$S_6$) (referring to FIG. 3) located on the commutation encoder within the motor portion 8 are inputted to the optimal commutation circuit 6, the optimal commutation circuit 6 moves the commutation pulses forward according to the motor velocity ($\omega$) and the load current (i) so that the commutation pulses will be optimized, and at the same time, after the commutation signal width has been optimized, the optimal commutation pulses ($N_{AO}$, $N_{BO}$, $N_{CO}$, $S_{AO}$, $S_{BO}$, $S_{CO}$) can be outputted into their corresponding power terminals.

Also, the frequency-voltage converter 5 converts the rotational velocity of the motor supplied from the velocity encoder, which includes the slit disc and the velocity sensing device, that is, the frequency into corresponding voltage, and then supplies the corresponding voltage to the velocity control circuit 4 into which a reference voltage (Vref) has been supplied.

In addition, the velocity control circuit 4 compares the reference voltage with the output voltage of the frequency-voltage converter, and then supplies a voltage corresponding to the difference between the compared voltages into the switching circuit 3.

Thus, the switching circuit 3 can alter the voltage supplied into the switching circuit 2 by pulse width modulation, or the SCR firing angle of the power supply circuit 1, with the result that the velocity of the brushless D.C. motor can be controlled accordingly.

Figure 3:
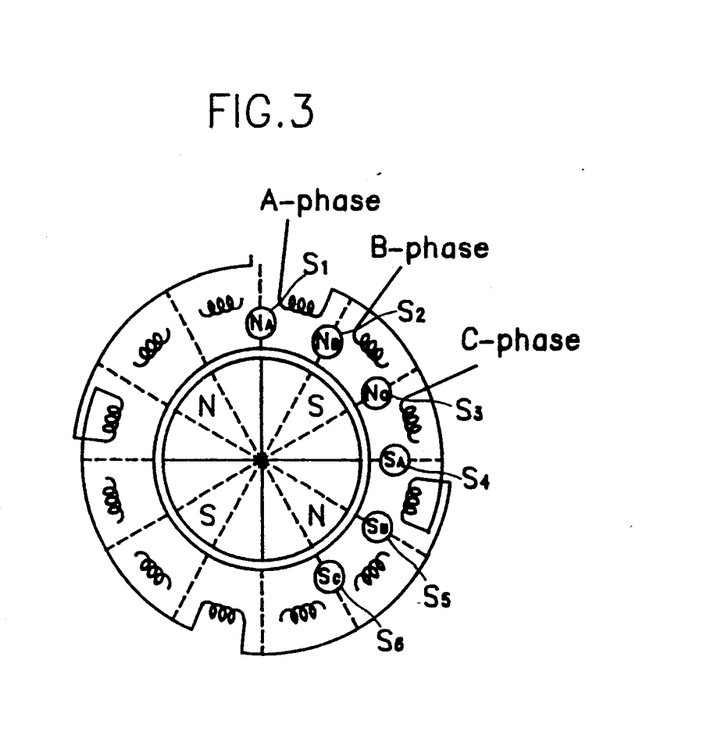
FIG. 3 is a cross-sectional view of the interior of a brushless D C. motor showing the positions of the phase coils and of the rotor position sensing devices, located within the motor portion 8 of FIG. 2, used in this invention.

In FIG. 3, a sensing device ($S_1$) senses the N-poles of the rotor, the rotor including two pairs of N and S poles, with the sensing device $S_1$ installed on the A-phase of the phase coil, with its A-phase, B-phase and C-phase mutually Y-connected. A sensing device ($S_4$) senses the S-poles, and is installed with a phase difference of 90° from the sensing device ($S_1$).

Also, a sensing device ($S_2$) which senses the N-poles of the rotor is installed on the B-phase of the phase coil, having a phase difference of 30° with both the A-phase of the coil and the sensing device ($S_1$). A sensing device ($S_5$) which senses the S-poles of the rotor is installed with a phase difference of 30° from the sensing device ($S_4$) A sensing device ($S_3$) which senses the N-poles of the rotor is installed on the C-phase of the phase coil, having a phase difference of 30° with both the B-phase of the coil and the sensing device ($S_2$) A sensing device ($S_6$) which senses the S-poles of the rotor is installed with a phase difference of 30° with the sensing device ($S_5$).

Figure 4:
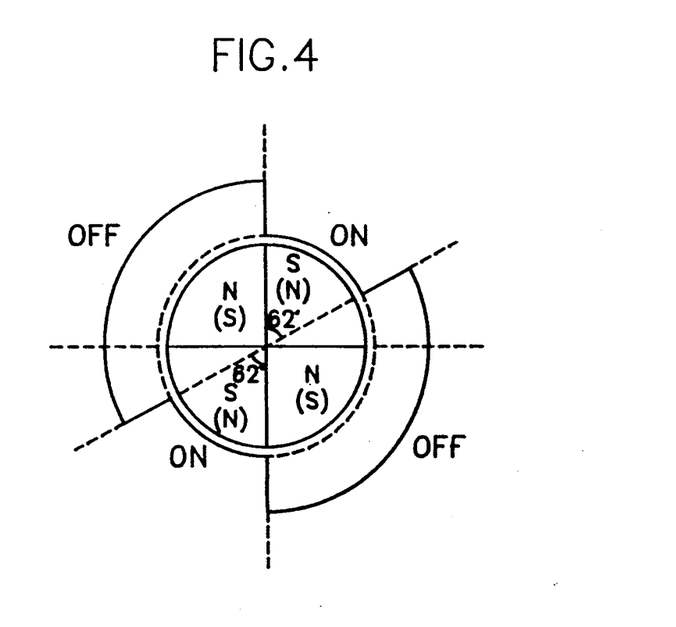
FIG. 4 depicts the positioning of the revolving shutter and the rotor pole, located within the motor portion 8 of FIG. 2, used in this invention.

In FIG. 4, the positional relationship between the revolving shutter and the rotor pole when using a phototransistor as a sensing device for the rotor is shown, with respect to a 4-pole 3-phase Y-connection bipolar brushless D.C. motor.

The boundary in which the on-areas of the revolving shutter come in contact with the off-areas of the shutter is coincidental with the boundary placed between the N-poles and the S-poles of the rotor, the on-areas of the revolving shutter designed to be larger than 60°, that is, to a degree of 62°, with the off-areas of the revolving shutter smaller than 120°, that is, to a degree of 118°. Therefore, the sum of the angles forming an on-area and an adjacent off-area will equal 180°.

Figure 5:
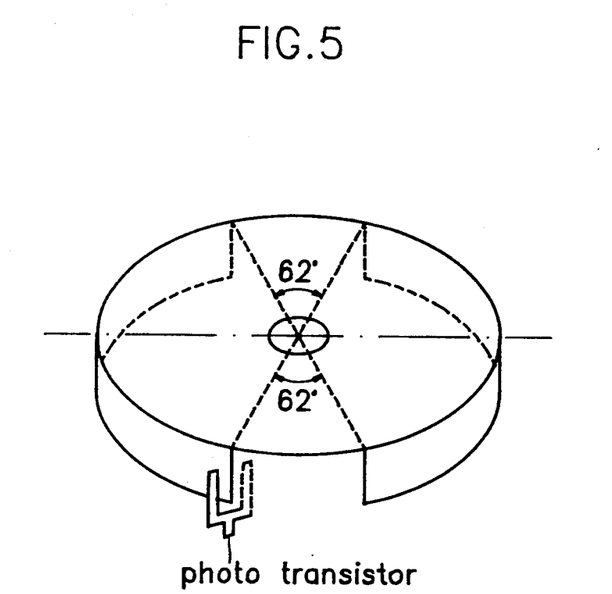
FIG. 5 depicts the revolving shutter for the phototransistor, located within the motor portion 8 of FIG. 2, used in this invention.

In FIG. 5, the revolving shutter, which is part of the commutation encoder, is designed for use with a phototransistor. Also, its commutation pulse width will not be affected by the eccentricity of the motor axis and of the rotor position sensing device.

Figure 6:
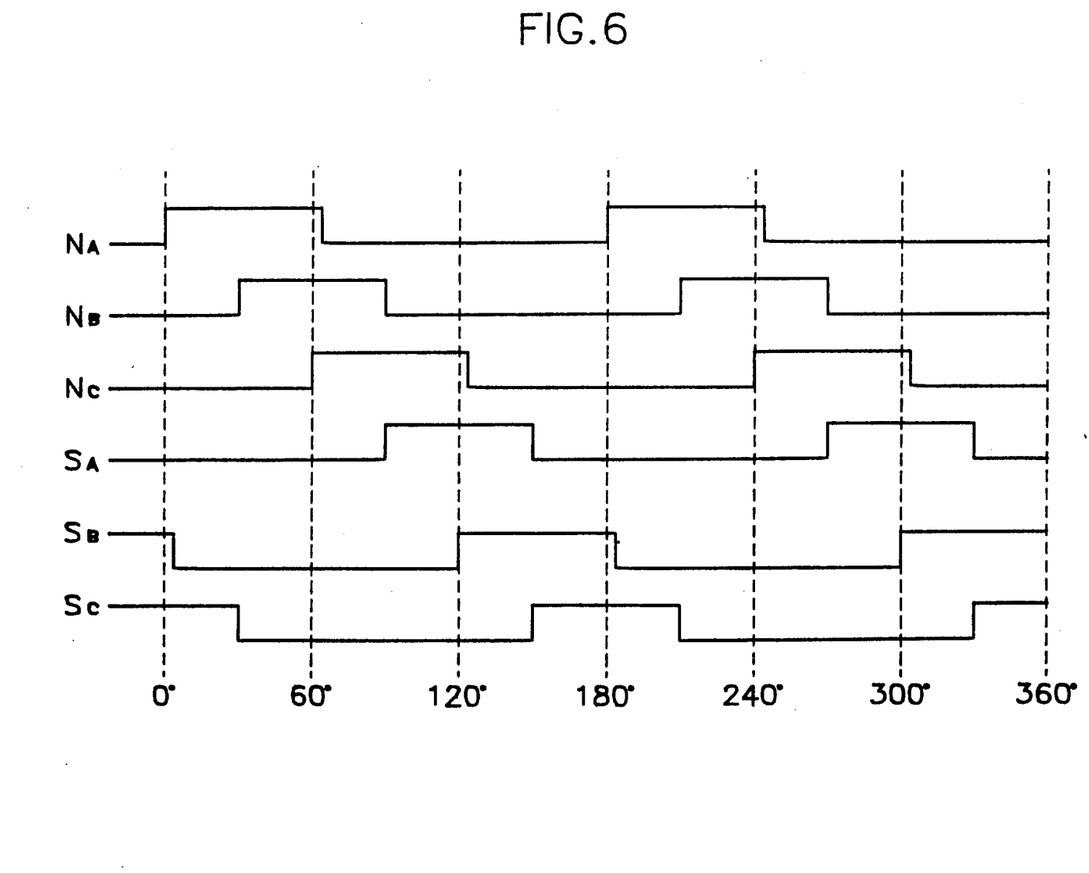
FIG. 6 depicts waveforms of communication pulses showing the mechanical angles from the rotor position sensing device.

In FIG. 6, the commutation pulses ($N_A$, $N_B$, $N_C$, $S_A$, $S_B$, $S_C$) shown are generated from the rotor position sensing devices ($S_1$, $S_2$, $S_3$, $S_4$, $S_5$, $S_6$), and are inputted to the optimal commutation circuit.

Figure 7:
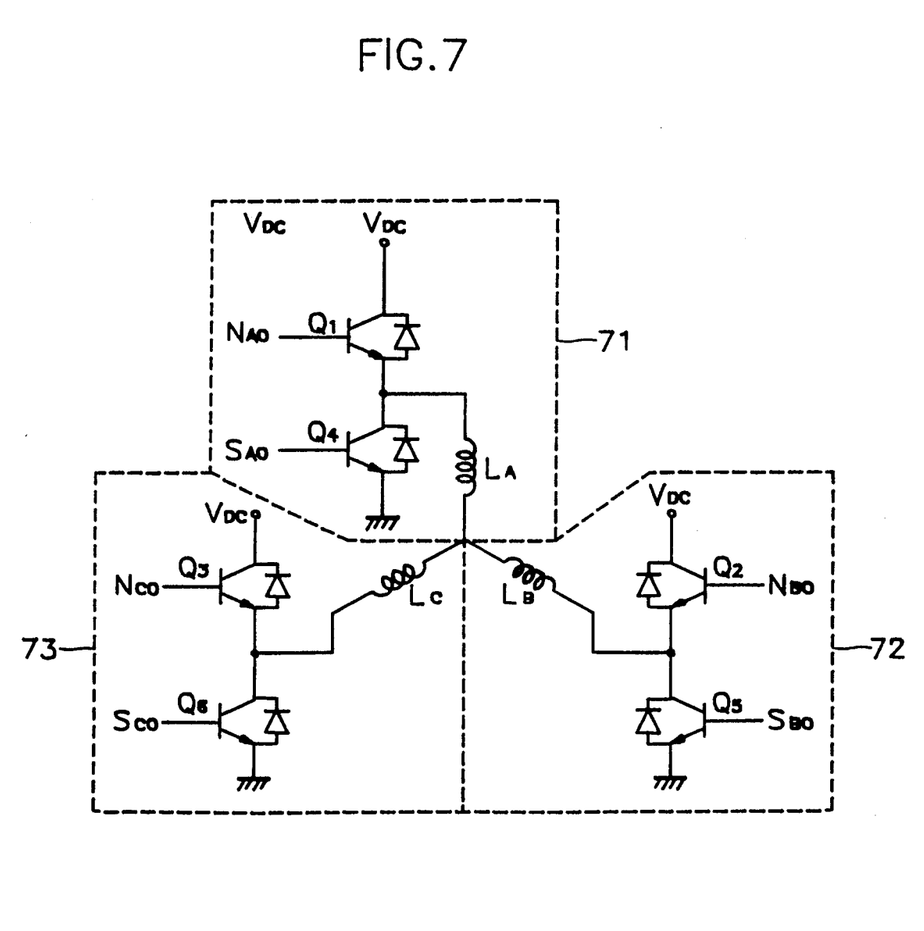
FIG. 7 is a detailed circuit diagram of the switching power amplifier 7 of FIG. 2.

In FIG. 7, the switching power amplifier shown comprises the following: an A-phase switching portion 71 which includes transistors ($Q_1$, $Q_4$) and a A-phase coil ($L_A$); a B-phase switching portion 72 which includes transistors ($Q_2$, $Q_5$) and a B-phase coil ($L_B$); and a C-phase switching portion which includes transistors ($Q_3$, $Q_6$) and a C-phase coil ($L_C$). The optimal commutation pulses ($N_{AO}$, $N_{BO}$, $N_{CO}$) are respectively supplied into each base of the transistors ($Q_1$, $Q_2$, $Q_3$) of the A-phase, B-phase and C-phase switching portions 71-73 of the amplifier, and the optimal commutation pulses ($S_{AO}$, $S_{BO}$, $S_{CO}$) are respectively supplied into each base of the transistors ($Q_4$, $Q_5$, $Q_6$).

The switching power amplifier circuit constituted as above turns on when the optimal commutation pulses ($N_{AO}$, $N_{BO}$, $N_{CO}$, $S_{AO}$, $S_{BO}$, $S_{CO}$) generated from the optimal commutation circuit 6 are inputted into the power switching circuit, after which if an N-pole of the rotor is detected by the sensing device ($S_1$) of the commutation encoder located in the motor portion 8 of FIG. 2, the sensing device ($S_1$) supplies a signal into the base of the transistor ($Q_1$) of the A-phase switching portion 71 of the switching power amplifier 7 through the optimal commutation circuit 6, of FIG. 2.

Thus, the transistor ($Q_1$) turns on and simultaneously, if the sensing device ($S_5$) of the commutation encoder located in the motor portion 8 of FIG. 2 detects an S-pole of the rotor, transistor ($Q_5$) turns on since the generated signal is supplied to the base of the transistor ($Q_5$) of the B-phase switching portion 72 of the switching power amplifier circuit 7 through the optimal commutation circuit 6 of FIG. 2.

Thus, the DC voltage ($V_{DC}$) can be supplied into the A-phase coil ($L_A$) and the B-phase coil ($L_B$) through transistor ($Q_1$), A-phase coil ($L_A$), B-phase coil ($L_B$) and transistor ($Q_5$) Then, when transistor ($Q_5$) turns off and simultaneously transistor ($Q_6$) turns on, the current which had been flowing from the A-phase coil ($L_A$) to the B-phase coil ($L_B$) will be flowing to the C-phase coil ($L_C$).

Next, in the case where transistor ($Q_1$) turns off and ($Q_2$) turns on, since transistor ($Q_5$) is maintaining its on-state, the current which had been flowing from the B-phase coil ($L_B$) to the C-phase coil ($L_C$), through transistor ($Q_2$), B-phase coil ($L_B$), C-phase coil ($L_C$) and transistor ($Q_6$), by the supplied DC voltage ($V_{DC}$), will be flowing from the B-phase coil ($L_B$) to the A-phase coil ($L_A$) when transistor ($Q_5$) turns on.

Next, in the case where transistor ($Q_1$) turns off and transistor ($Q_3$) turns on, since transistor ($Q_4$) is maintaining its on-state, the current which had been flowing from the C-phase coil ($L_C$) to the A-phase coil ($L_A$), through transistor ($Q_3$), C-phase coil ($L_C$), A-phase coil ($L_A$) and transistor ($Q_4$), by the supplied DC voltage, will be flowing from the C-phase coil ($L_C$) to the B-phase coil ($L_B$) when transistor ($Q_4$) turns off and simultaneously transistor ($Q_5$) turns on.

As described above, this invention operates turning on or off the power transistors ($Q_1$, $Q_2$, $Q_3$, $Q_4$, $Q_5$, $Q_6$) according to the optimal commutation pulses ($N_{AO}$, $N_{BO}$, $N_{CO}$, $S_{AO}$, $S_{BO}$, $S_{CO}$).

Figure 8:
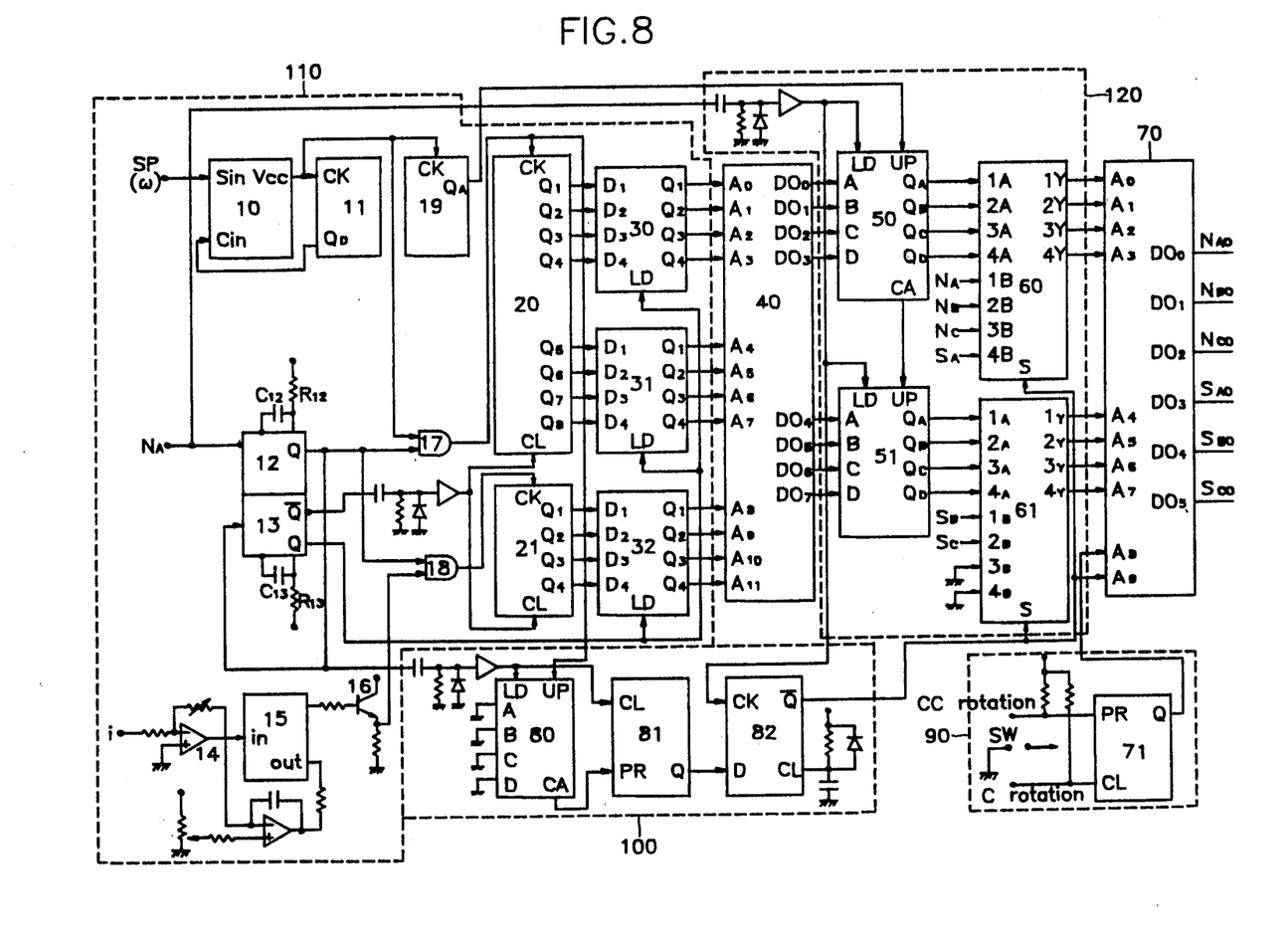
FIG. 8 is a detailed circuit diagram of the optimal commutation circuit of this invention.

Referring to FIG. 8, a detailed diagram of the optimal commutation circuit for the trapezoidal driving brushless D.C. motor is shown, comprising a αROM 40 which reserves, as data, the commutation advance angle (α) of the commutation pulses represented by the inverse tangent function of the motor velocity (ω) and the load current (i), and a αROM addressing portion 110 which supplies address signals into the address terminals ($A_0$–$A_{11}$) of the αROM 40.

The optimal commutation circuit also includes a pattern ROM addressing portion 120 comprising presettable up-counters 50, 51, which count up using the output of a binary counter 19 as a clock signal, the binary counter 19 having been preset at every reference commutation pulse ($N_A$) by a commutation advance angle (α), used as the present value. The commutation angle (α) corresponds to the present motor velocity (ω) and the load current (i), read in the αROM 40 according to the output signal of the αROM addressing portion 110. The data selectors 60, 61, are selecting one of the two signals, that is, either the commutation pulses ($N_A$-$N_C$, $S_A$-$S_C$), for outputting the starting commutation pattern from the pattern ROM 70, or the output signals of the presettable up-counters 50, 51, for outputting the driving commutation pattern from the pattern ROM 70 in the driving state.

A starting/driving signal selecting portion 100 outputs signals into the data selectors 60, 61 of the pattern ROM addressing portion 120 for the purpose of selecting a starting/driving state.

A pattern ROM 70 outputs a starting commutation pattern according to the commutation signals ($N_A$-$N_C$, $S_A$-$S_C$), or outputs a driving commutation pattern according to the output signals of the presettable up-counters 50, 51 of the pattern ROM addressing portion 120.

A clockwise-counterclockwise motor rotation selecting portion 90 which outputs into the pattern ROM 70 a signal set according to the desired motor rotation (clockwise or counterclockwise).

In addition, the optimal commutation circuit contains a αROM addressing portion 100 comprising a phase-locked loop integrated circuit (PLL IC) 10 which multiplies a slit pulse (SP) generated from the velocity sensing device of the motor, and a binary counter 11.

A monostable circuit 12 synchronizes with the negative edge of the commutation pulse ($N_A$), with the result that a sample pulse is outputted.

A monostable circuit 13 synchronizes with the negative edge of the sample pulse, that is, the output of the monostable circuit 12, with the result that a load pulse is outputted.

A current transformer (C.T.) which transforms the sensed load current (i) into a voltage, the voltage gain being regulated by an operational amplifier 14.

A voltage-frequency converter 15 converts the voltage whose gain is regulated by the operational amplifier 14 into frequency.

A AND gate 18 logically multiplies the output of the monostable circuit 12 and the output signal of the voltage-frequency converter 18, whose level is regulated by transistor 16.

An 8-bit binary up-counter 20 counts using the output of a AND gate 17 as a clock signal during the sample pulse width of the monostable circuit 12, the AND gate 17 producting the output of the PLL IC 10 with the output of monostable circuit 12.

A binary up-counter 21 uses the frequency sampled by the AND gate 18 as a clock signal.

Registers 30, 31 supply the output of the counters 20, 21, counted during the sample pulse width according to a load signal (LD), that is, a load pulse outputted from the monostable circuit 13 into low order 8-bit address input terminals ($A_0$-$A_7$) of the αROM 40.

Register 32 supplies the output of the counter 21, counted during the sample pulse width according to the load signal (LD), that is, the load pulse outputted from the monostable circuit 13 into high order 4-bit address input terminals ($A_8$-$A_{11}$).

The αROM 40 reserves data relating to the commutation advance angle ($\alpha$), which is in the form of a function dependent not only on the motor velocity ($\omega$), but also on the load current (i), as described below.

$$\alpha^o = \tan^{-1}(\omega, i)$$
$$= \tan^{-1}(\omega L/R)[1 + (M/N) * F_i]$$

where:
R = resistance of the motor
L = inductance of the motor
$\omega$ = angular motor velocity
$F_i$ = load factor (represents the comparative weightings, which is calculated by comparing the angle by which the advanced commutation angle is affected by the load current, with the angle by which the advanced commutation angle is affected by the angular velocity of the motor, which is determined by the mechanical and electrical characteristics of the motor)

N: When the effect of the current is calculated discretely as shown in FIG. 1, N becomes an integer. For example, in the case of FIG. 8, $N = 2^4 = 16$.

M: When the effect of the current is calculated discretely as shown in FIG. 1, $M = 0, 1, 2, \ldots$, that is, the integer of $(N-1)$.

The pattern ROM 7, at which the data of not only the clockwise driving commutation pattern and the clockwise starting commutation pattern but also the counterclockwise driving commutation pattern and the counterclockwise starting commutation pattern are respectively reserved on another page (memory location), is constructed so that one pattern among the commutation patterns can be outputted by the signal selecting portion 100, which selects signals suitable for either the starting state or the driving state, and the clockwise/-counterclockwise motor rotation selecting portion 90.

The signal selecting portion 100 comprises a presettable up-counter which uses a differential pulse of the sample pulse, which is the output signal of the monostable circuit 12 of the αROM addressing portion 110, as a load signal (LD), and uses the output of the AND gate 17 as a clock signal, a D-flip flop 81 which is preset by a carry-out signal (CA) of the presettable up-counter 80, and a D-flip flop 82 which the output signal (Q) of the D-flip flop 81 is inputted into, the D-flip flop 82 using the differential pulse of the commutation signal ($N_A$) as a clock signal.

Clockwise/counterclockwise motor rotation selecting portion 90 comprises a switch (SW) which is connected to a power source terminal in case that the motor is rotated clockwise, and is grounded in case that the motor is rotated counterclockwise, and a D-flip flop 71 which uses each generated signal differently according to the connecting state of the switch (SW) as either a preset signal (PR) or a clear signal (CL). The circuit shown in FIG. 8 is designed so as to move the commutation pulses forward optimally by storing the value of the patterns shown in FIGS. 9(a)-9(d), reading by means of the presettable up-counters 50, 51, the address offset value of the pattern ROM 70 at every positive edge of the reference commutation pulses (for example, $N_A$) from the αROM 40, in which the advanced angle $\alpha^0 = \tan^{-1}(\omega, i)$, which depends on the angular motor velocity ($\omega$) and the load current (i), is stored, with the preset value having been read out of the αROM 40 into the presettable up-counters 50, 51.

The detailed operation of this circuit is explained below.

A slit pulse (SP), which is equal to the number of slits (for example, $64 = 2^6$) of the velocity encoder 8, is used for detecting the number of turns of the motor, and is generated from the velocity sensing device 8 after every complete rotation (for example, 64). The slit pulse (SP) is multiplied 16 times by the multiplier circuit, comprising the PLL IC 10 and the binary counter 11, and then is inputted into the AND gate 17.

A sample pulse having the pulse width which was determined by the register ($R_{12}$) of the monostable circuit 12 and a condenser ($C_{12}$) is inputted into the AND gate 17, and this input operation is synchronized with the negative edge of the reference commutation pulse ($N_A$) of the rotor position sensing device of the commutation encoder 8. Thus, the AND gate 18 outputs a velocity pulse, which is multiplied 16 times during the sample pulse width (for example, 3.7 ms), to the clock terminal of the 8-bit binary up-counter 20.

If a one-shot pulse, (named below as a load pulse) synchronized with the negative edge of a sample pulse generated by the other monostable circuit 13, is applied into the LD terminal of the registers 30,31, the value counted during the sample pulse width is loaded into registers 30, 31 and then applied into the low order 8-bit address ($A_0$–$A_7$) terminals of the αROM 40.

The load current (i) flowing through the stator coil of the motor is detected by the current sensing device (C.T), with the detected load current converted into voltage, and the gain of the voltage being regulated by the operational amplifier 14. The voltage whose gain was regulated is then converted into frequency corresponding to the present load current (i), by the voltage-frequency converter 15, with the converted frequency being converted into a digital signal (for example, TTL level or CMOS level) by a transistor 16, and the digital signal is then applied into the AND gate 18.

Since the sample pulse which is generated by the monostable circuit 12 is supplied into the AND gate 18, the sampled and converted frequency can be inputted into the clock (CK) terminal of the binary up-counter 21.

Thereafter, the load pulse which is generated by the monostable circuit 13 is loaded into the LD terminal of the register 32 and then applied into the high order 4-bit address ($A_8$–$A_{11}$) terminals of the αROM 40. (The voltage-frequency converter 15, transistor 16, AND gate 18, binary up-counter 21 and register 32 can be substituted by one analog-digital converter.)

By this method described above, the value of the commutation advance angle $\alpha^o = \tan^{-1}(\omega, i)$, dependent on the angular motor velocity ($\omega$) and the load current (i), is preset as the 8-bit value of the αROM and the preset value of the presettable up-counters 50, 51 at every positive edge of the reference commutation pulse ($N_A$).

By applying a pulse, divided into half-cycles by the binary up-counter 19, into the clock terminal of the presettable up-counters 50, 51, presettable up-counters 50, 51 start and continue counting up from the value α, which is the preset value, to right before the next present value is preset.

Thus, the value of the 8-bit presettable up-counters 50, 51 can be outputted.

For starting the motor from the stop state, the starting commutation pattern should be outputted by the addressing pattern ROM 70 by means of the commutation pulses ($N_A$, $N_B$, $N_C$, $S_A$, $S_B$, $S_C$) generated from the position sensing device 8 of the motor.

The operation can be achieved by connecting the output terminals of the signal selecting portion 100 respectively to the data selectors 60, 61, which are multiplexers such as chips of Ser. No. 74157, the data selectors 60, 61 selecting a group of input signals from the commutation pulses ($N_A$–$S_C$) used for outputting the starting commutation pattern for starting the motor, and the output values of the presettable up-counters 50, 51 from the addressing pattern ROM 70 used for outputting the driving commutation pattern.

Thus, in the case where the actual number of motor rotations is smaller than the reference number of motor rotations, the starting commutation pattern consisting of the commutation pulses ($N_A$–$S_C$), reserved in the addressing pattern ROM 70, will be outputted, and in the case where the actual number of motor rotations is larger than the reference number of rotations, the driving commutation pattern consisting of the output values of the presettable up-counters 50, 51, reserved in the addressing pattern ROM 70, will be outputted.

The selecting circuit portion 100 is comprised of presettable up-counter 80 and D-flip flops 81, 82.

Since not only the starting commutation pattern and the driving commutation pattern, but also the counterclockwise direction starting commutation pattern and the reserved direction driving commutation pattern are reserved in the pattern ROM 70, the condition that distinguishes clockwise rotation from counterclockwise rotation is classified by applying the output signal of the clockwise/counterclockwise motor rotation selecting portion 90 of the motor to the address terminal ($A_s$) of the pattern ROM 70, the motor rotation selecting portion 90 including the switch (SW) and the D-flip flop 71.

In a 4-pole 3-phase brushless motor, two phases should always be conducting. In the case where the on-portion of the revolving shutter is less than 60°, a problem exists whereby only one phase is conducting. To prevent this problem, the on-portion of the revolving shutter is designed to be greater than 60°.

Also, in this case, if the signal generated from the rotor position sensing device is used as a commutation pulse, a worse problem will exist, in which all three phases of the motor will conduct simultaneously.

Thus, by using the signal pulse generated from the rotor position sensing device as the address signal of the pattern ROM 70, in which the commutation pattern is reserved, only two phases of the motor will always be conducting.

The commutation pattern ROM 70 is comprised as follows.

Figure 9A:
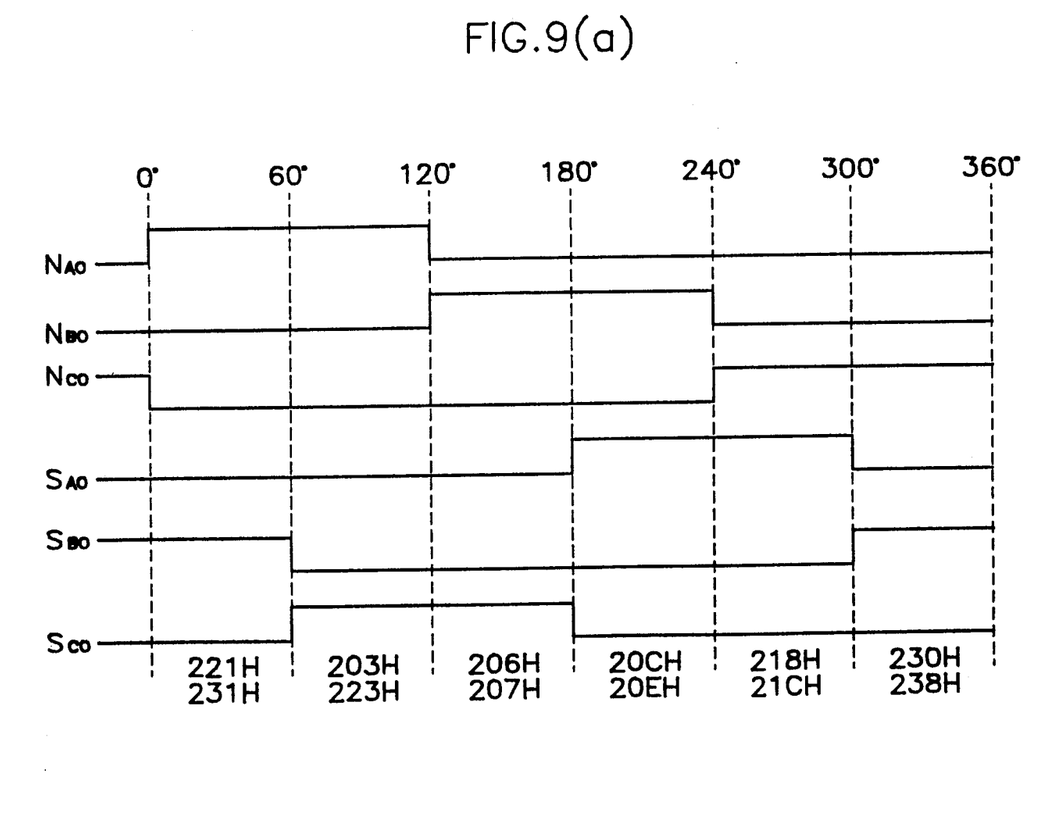
FIG. 9(a) depicts starting commutation patterns for rotation of the brushless D.C. motor in a clockwise direction.
Figure 9B:
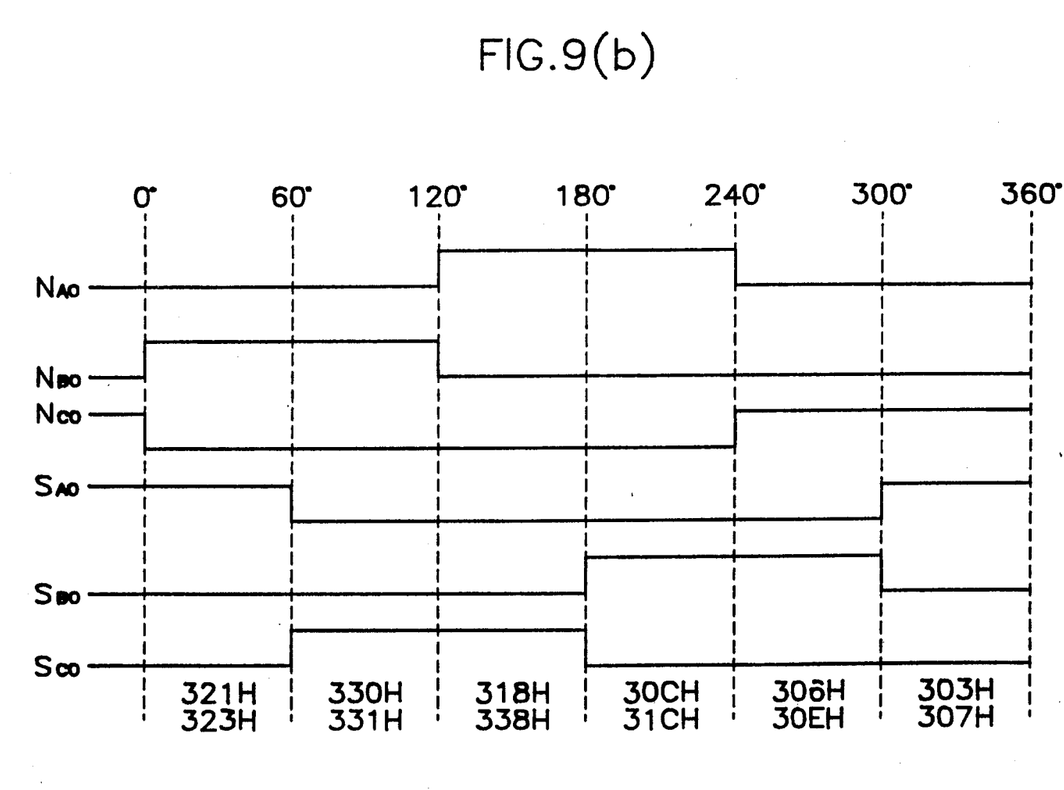
FIG. 9(b) depicts starting commutation patterns for rotation of the brushless D.C. motor in a counterclockwise direction.
Figure 9C:
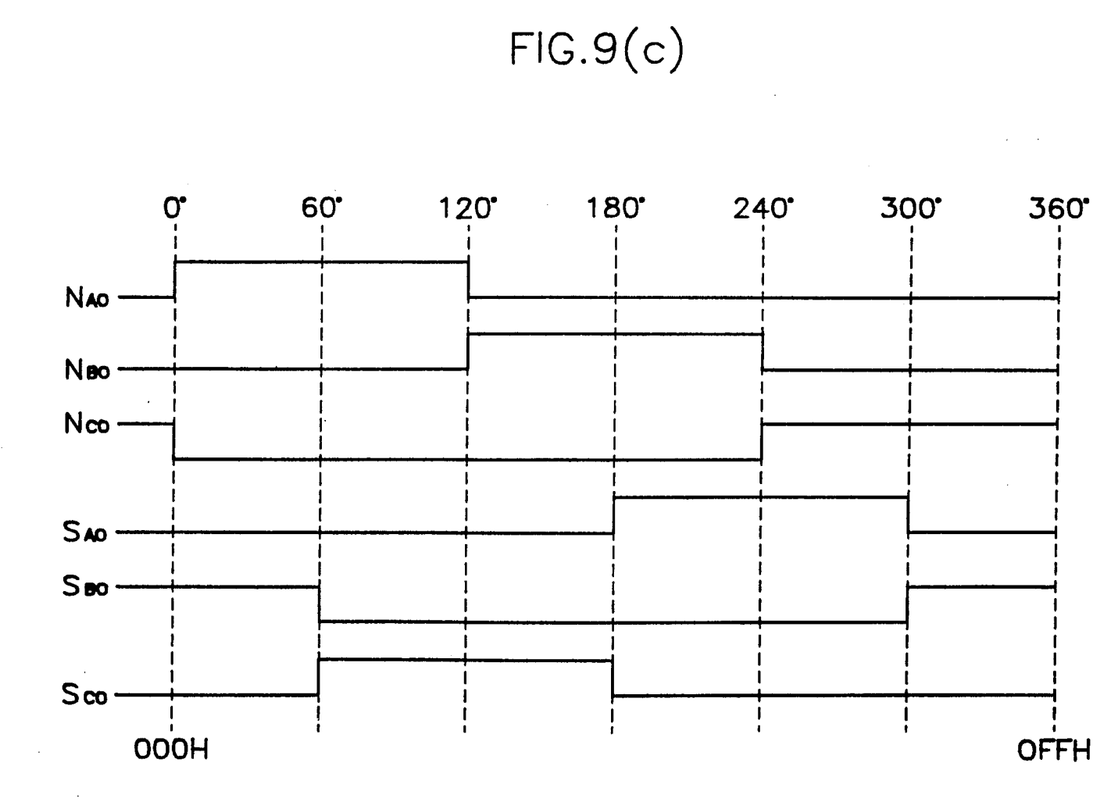
FIG. 9(c) depicts driving commutation patterns for rotation of the brushless D.C. motor in a clockwise direction.
Figure 9D:
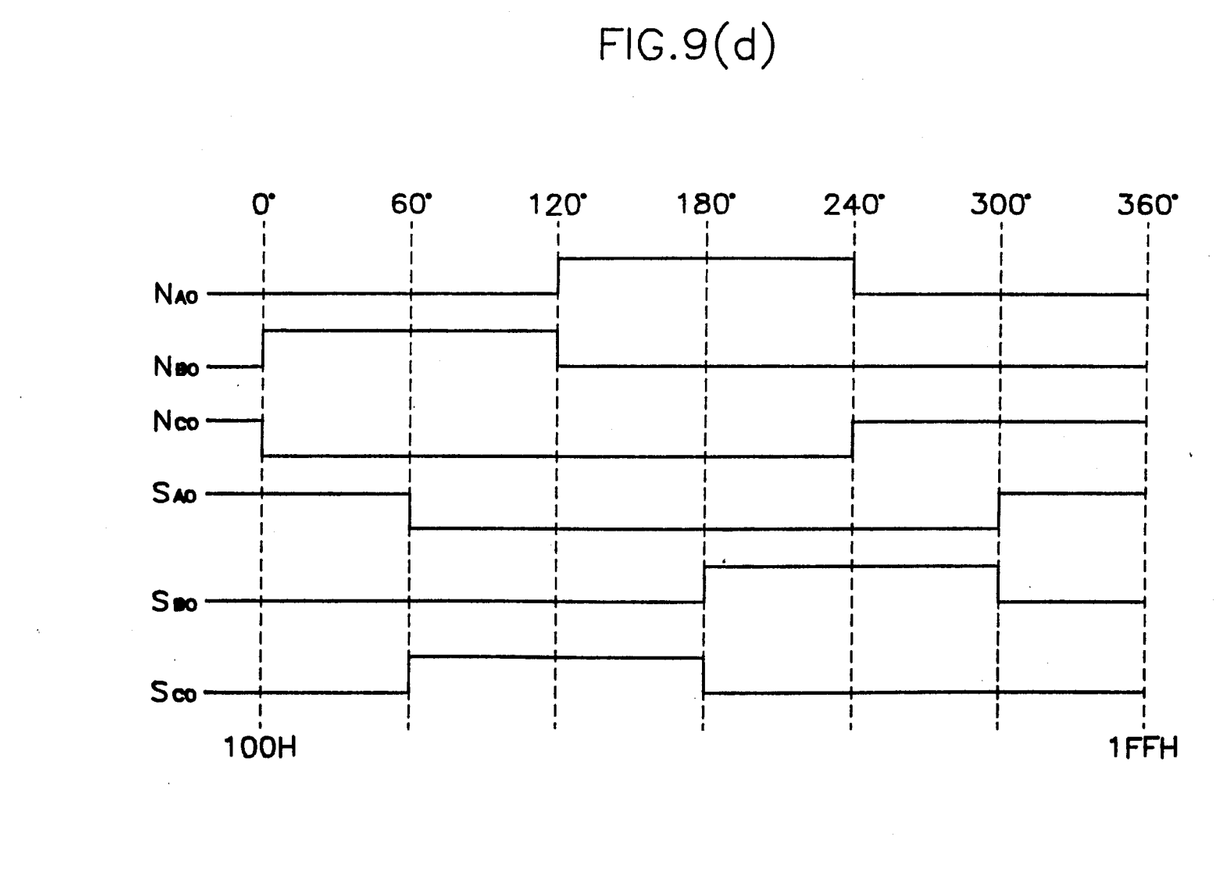
FIG. 9(d) depicts driving commutation patterns for rotation of the brushless D.C. motor in a counterclockwise direction.

A clockwise driving commutation pattern [shown in FIG. 9 (c)], counterclockwise driving commutation pattern [shown in FIG. 9(d)], clockwise starting commutation pattern [shown in FIG. 9(a)], and counterclockwise starting commutation pattern [shown in FIG. 9(b)] are respectively reserved at the 0 page, the 1 page, 64 bytes of the 2 page, and 64 bytes of the 3 page.

The angles displayed on the upper side of FIGS. 9(a)–9(d) represent the advance angles.

The hexadecimal numbers displayed on the lower side of FIGS. 9(a)–(d) represent the address of the pattern ROM 70.

In these examples, the data value of the 2 and the 3 page, at which the starting commutation patterns are reserved, is similar to the value of the address, but the data value of the address, minus the address pattern value, is reserved as "0".

In the case where the address value includes three ones ("1"), when the motor is started in a clockwise direction the data value, where "1" of the low order bit is treated as "0", will be reserved, and when the motor is started in a counterclockwise direction the data value, where "1" of the high-order bit is treated as "0", will be reserved.

A more detailed description of the operation of the circuit of the present invention, on the basis of the description above, is explained as follows.

When the motor is rotated in a clockwise direction, and the current is detected in accordance with the load condition, the α ROM addressing portion 110, as shown in FIG. 8, selects an α angle corresponding to the condition and then outputs the α angle.

Then the α angle, which is digital in value, is inputted into the up-counters 50, 51 of the pattern ROM addressing portion 120.

The clockwise driving condition is determined by the starting/driving signal selecting portion 100 and the clockwise/counterclockwise motor rotation selecting portion 90, as described in the above explanation. In a clockwise driving condition, O is inputted, O into address terminals (A8) and (A7), and O into the selecting terminals (S) of the data selectors 60, 61.

Accordingly, data which is memorized at the O page of the pattern ROM 70 will be outputted and thus, data selectors 60, 61 will select the output of up-counters 50, 51.

Since the memory of the O page is positioned from 000H to 0FFH, the up-counter, which has been preset by the angle α, is continuously selecting an address with a value increased by one.

Thus, the pattern ROM 70 outputs the data patterns of FIG. 9(c) corresponding to the accessed address, thereby optimizing the motor's operation.

As explained above, since the optimal commutation circuit of this invention, which can be used regardless of the connecting method (Y-connection, Δ-connection or current-independent connection) of the phase coil or the driving method (unipolar or bipolar), generates commutation pulses with an optimal advance angle in accordance with the angular motor velocity (ω) and the load current (i), maximum torque and efficiency can be achieved in relation to the amount of load on the motor.

In addition, mass production and repair convenience of the motors described in this invention can be obtained by the advantages of this invention, that is, the installations of the rotor position sensing devices will become easier, by placing the rotor position sensing devices in the same position for any motor.

On the basis of the above explanation, it is understandable that the number of multiplication operations of the multiplier circuit including the PLL IC 10 and the binary counter 11, the number of division operations of the divider, the sample pulse width of the monostable circuit 12, the bits of the binary counters 20, 21 and the registers 30, 31, 32, the capacity of the αROM 40, that is, the address bits of the ROM and the bits of each word, the bits of the presettable up-counters 50, 51 and the address bits of the pattern ROM 70, are all determined according to the commutation advance angle (α), resolved by the angular motor velocity (ω) and the load current (i).

What is claimed is:

1. A commutation circuit for a trapezoidal drive brushless D.C. motor, said motor having a commutation angle, an angular motor velocity and a load current, said circuit generating reference commutation pulses and a control commutation pattern and comprising:
    a) an αROM for storage of a commutation advance pulse represented by a commutation advance angle α as a sequence of address signals, said commutation advance angle being calculated as an inverse tangent function of said motor velocity and said load current;
    b) an αROM address area supplying said address signals into address terminals of said αROM;
    c) a pattern ROM outputting a control commutation pattern, said control commutation pattern being either a starting commutation pattern or a driving commutation pattern;
    d) a pattern ROM address area comprising:
        i) a presettable up-counter using the output of a binary counter as a clock signal to generate a driving pattern, said binary counter having been preset at every reference commutation pulse by said commutation advance angle (α); and
        ii) a data selector to select between said starting commutation pattern and said driving commutation pattern;
    e) a control signal selecting area outputting a pattern selection signal into said data selector to select said starting or driving pattern for output; and
    f) a direction-of-rotation selector outputting a clockwise or counterclockwise rotation signal to said pattern ROM;
whereby in said running state said motor commutation is advanced by said advance angle α.

2. A circuit according to claim 1 wherein said commutation advance angle α is defined as follows:

$$\alpha^* = \tan^{-1}(\omega L/R)[1 + (M/N)^* F_i];$$

where
R = resistance of said motor;
L = inductance of said motor;
ω = angular velocity;
$F_i$ = a load factor representing comparative weightings calculated by comparing the relative contributions of said load current and said angular velocity to said commutation advance angle;
N = an integer describing the effect of load current; and
M = (N−1).

3. A brushless D.C. motor having a commutation circuit according to claim 1.

4. The device defined in claim 1, characterized in that said pattern ROM reserves the data of not only clockwise driving commutation pattern and clockwise starting commutation pattern but also counterclockwise driving commutation pattern and counterclockwise starting commutation pattern respectively on another page and one pattern among said commutation patterns is outputted according to starting state or driving state by signal selecting portion and clockwise/counter clockwise rotation selecting portion.

5. The device defined in claim 4, characterized in that pattern ROM reserves the data value of the starting commutation pattern which is similar to the address value, said data value of address, except for pattern value which is similar to the value of address, being reserved as "0", and in case that the address value includes three "1", when motor is started clockwisely, the data value that "1" of low order bit has been treated as "0" may be reserved and when motor is started counterclockwisely, the value that "1" of high order bit is treated as "0" may be reserved.

6. The device defined in claim 1, characterized in that said α ROM addressing portion comprises PLL IC which multiplies slit pulse(sp) generated from velocity sensing device of motor, and binary counter, mono stable circuit which is synchronizing with negative edge of commutation pulse ($N_A$) with the result that sample pulse is outputted,
monostable circuit which is synchronizing with the negative edge of sample pulse, that is, the output of said monostable circuit with the result that load pulse is outputted, operational amplifier which is regulating the gain of voltage into which the sensed load current(i) has been transformed by current transformer(C.T.), voltage-frequency converter which is converting the voltage whose gain is regulated by said operational amplifier into frequency, AND gate which logically products by the output of said monostable circuit, the output signal of said voltage-frequency convertor whose level is regulated by transistor, 8 bit binary up counter which counts using the output of AND gate as a clock signal during the sample pulse width of said monostable circuit, said AND gate producing the output of said PLL IC by the output of monostable circuit, binary up counter which uses the frequency sampled by said AND gate as a clock signal, register which supplies the output of counter counted during sample pulse width according to load signal(L), that is, load pulse outputted from said monostable circuit into low order 8 bit address input terminal($A_0$-$A_7$) of said $\alpha$ ROM, and register which supply the output of said counter counted during sample pulse width according to load signal(LD), that is, load pulse outputted from said monostable circuit into high order 4 bit address input terminal($A_8$-$A_{11}$).

7. The device defined in claim 1, characterized in that said signal selecting portion comprises presettable upcounter which uses differential pulse of sample pulse which is the output signal of monostable circuit of said $\alpha$ ROM addressing portion as a load signal and uses the output of said AND gate as a clock signal, D-flip flop which is preset by carrying out signal(CA) of said presettable up counter and which the output signal(Q) of said D-flip flop is inputted into and uses differential pulse of commutation pulse ($N_A$) as clock signal.

8. The device defined in claim 1, characterized in that clockwise/counterclockwise rotation selecting portion comprises switch(SW) which is connected to power source terminal in case that motor is rotated counterclockwisely and is grounded in case that motor is rotated clockwisely and D-flip flop which uses each signal generated differently according to the connecting state of said switch(SW) as preset signal(PR) or clear signal(CL).

9. A brushless D.C. motor having a commutation circuit, a commutation angle, an angular motor velocity and a load current, said circuit outputting a commutation control pattern during a driving mode rather than a starting mode of said motor, said control pattern comprising a commutation advance angle to modify said commutation angle, said commutation advance angle being calculated as an inverse tangent function of said angular motor velocity and said load current.

* * * * *